United States Patent [19]
Böhm et al.

[11] Patent Number: 4,971,387
[45] Date of Patent: Nov. 20, 1990

[54] AIR GUIDE DEVICE FOR AN AUTOMOBILE ROOF

[75] Inventors: Horst Böhm, Frankfurt; Dieter Federmann, Hanau; Albert Schlapp, Dreieich, all of Fed. Rep. of Germany

[73] Assignee: Rockwell-Golde G.m.b.H., Fed. Rep. of Germany

[21] Appl. No.: 489,116

[22] Filed: Mar. 5, 1990

[30] Foreign Application Priority Data

Mar. 17, 1989 [DE] Fed. Rep. of Germany ....... 3908750

[51] Int. Cl.⁵ .............................................. B60J 7/22
[52] U.S. Cl. ................................................... 296/217
[58] Field of Search ......................................... 296/217

[56] References Cited

U.S. PATENT DOCUMENTS

| | | | |
|---|---|---|---|
| 4,482,183 | 11/1984 | Grimm et al. | 296/217 |
| 4,676,546 | 6/1987 | Igel | 296/217 |
| 4,681,364 | 7/1987 | Bienert et al. | 296/217 |
| 4,684,168 | 8/1987 | Lupo | 296/217 |
| 4,705,316 | 11/1987 | Jardin et al. | 296/217 |

Primary Examiner—Robert R. Song

[57] ABSTRACT

An air guide device, which is suitable both for sliding roofs and for sliding-lifting roofs, comprises a wind deflector plate, pivotally journalled by hinge assemblies beneath a front, fixed automobile roof, the pivotal movements of which deflector plate are controlled by control members, displaceably driven by the drive system of the sliding lid, which control members for this purpose bear from above on control surfaces formed on the wind deflector plate. The control members do not release the control surfaces until, in the opening displacement of the sliding lid, the latter has opened sufficiently far for the wind deflector plate, subject to the action of springs acting in the upward pivoting direction, to pivot upwards beyond the automobile roof without striking the slid lid. In the reverse movement direction, the control members run onto the control surfaces before the sliding lid has reached its closure position and pivot the wind deflector plate against the force of the springs into the at-rest position of the air guide device.

8 Claims, 2 Drawing Sheets

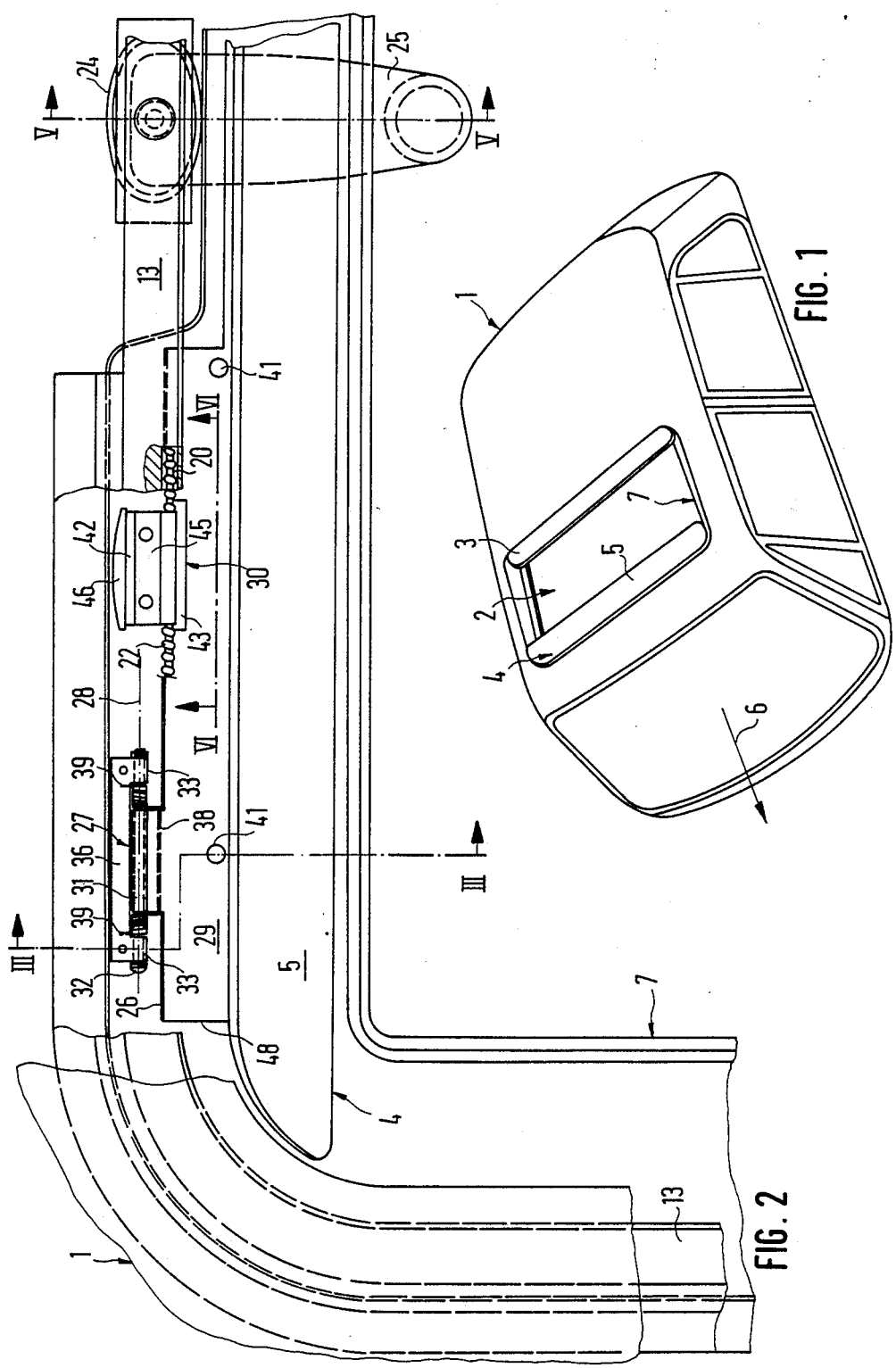

AIR GUIDE DEVICE FOR AN AUTOMOBILE ROOF

FIELD OF THE INVENTION

This invention relates to an air guide device for an automobile roof.

More particularly, the air guide device relates to one which is for an automobile roof, which comprises a roof opening surrounded at front and sides by a roof frame assembly, which opening can be closed by a sliding lid, guided on guide rails mounted laterally on the roof frame assembly and driven by drive cables slidable in compression-stiff manner therein. The air guide device comprises a wind deflector plate, pivotal along the front edge of the roof opening about a hinge axis, subject to spring stress, and adjustable into a working position and at-rest position respectively as a function of the movements of the sliding lid by a control member guided in the direction of the hinge axis. The control member can be displaced by a drive cable moving with the sliding lid and adjusts the wind deflector plate via a control surface in rigid connection therewith.

DESCRIPTION OF THE PRIOR ART

In a known air guide device of this type (DE-PS No. 26 58 433), the control member is of plastics and is injection moulded onto the cable. The cable and control member are guided in a tube, which consists of two sections, of which one section is closed and one section is slit. The two sections are connected by a sleeve. The control member is guided in the slit section of the tube. The tube serves as a hinge pin for hinges disposed spaced apart from each other, the slit tube section being situated between the hinges. The control member co-operates with a cam path, which is so formed in one piece on the air guide device that it projects rearwards horizontally in the direction of travel when in the working position. The surface of the cam path is twisted in the manner of a helix and co-operates with the control member in such a way that, when a displacement of the sliding lid in the closure direction occurs, the control member runs onto the cam path and, via the twisted surface of the cam path, pivots the air guide device into the at-rest position and holds it there. In this position, the cam path projects downwards.

A disadvantage of this known air guide device is the limitation of the movement travel of the control member at both ends by the hinges, for which reason also the possible opening displacement of the sliding lid and therefore the length of the roof opening is limited. Furthermore, the portion of the cam path orientated rearwardly in the working position of the air guide device requires, during pivoting into the at-rest position, a relatively large pivoting space, which with the trend to manufacture sliding roofs with ever smaller overall height is not always available. The known air guide device is also not suitable for use in sliding-lifting roofs, of which the lid is pivotal about an axis situated in the vicinity of the front edge of the lid, because in the known construction the cable fixed to the longitudinal side of the sliding lid and journalled in a guide tube does not permit pivoting of the lid. Furthermore, the form of the surface of the cam path twisted in the manner of a helix, which moreover is in one piece with the air guide device, involves considerable manufacturing cost.

No less expensive also is the manufacture and fitting of the cable guide tube, the two different tube portions of which must be joined together by sleeves and must be secured several times to the fixed roof frame by connecting elements, while the entry of the cable secured to the side of the lid must be exactly aligned with the lid guide. Since the lever ratio between control member and cam path is disadvantageous, application of considerable force is required for pivoting the air guide device and this leads, in the last phase of the lid displacement into the closed lid position, to difficult running.

The objective of the present invention is to provide an air guide device which shall be suitable both for sliding roofs and also for sliding-lifting roofs of low overall height, shall comprise only a few, simply shaped parts, the installation of which shall be uncomplicated, and which shall not give rise to difficult running in the sliding of the lid.

SUMMARY OF THE INVENTION

According to the present invention, there is provided an air guide device for an automobile roof, which comprises a roof opening surrounded at front and sides by a roof frame assembly, which opening can be closed by a sliding lid, guided on guide rails mounted laterally on the roof frame assembly and driven by drive cables slidable in compression-stiff manner therein, the device comprising a wind deflector plate, pivotal along the front edge of the roof opening about a hinge axis, subject to spring stress, and adjustable into a working position and at-rest position respectively as a function of the movements of the sliding lid by a control member guided in the direction of the hinge axis, wherein the control member can be displaced by a drive cable moving with the siding lid and adjusts the wind deflector plate via a control surface in rigid connection therewith, and the control surface is substantially planar and is provided on the upper face of a connecting web, which is disposed between the hinge axis and the wind deflector plate and which extends beneath the forward, fixed automobile roof, and the control member is fixed to one of the drive cables, for the sliding lid and, for the purpose of pivoting the wind deflector plate, runs onto and runs off respectively the control surface and rests on it in the at-rest position of the wind deflector plate.

The substantially plane control surface requires only small manufacturing cost and does not necessitate any pivoting space beneath the hinge axis, with the result that the air guide device does not exert any adverse effect upon the overall height of the sliding roof or sliding-lifting roof construction. The control member can act at a considerable distance from the hinge axis upon the control surface, so that a considerable exertion of force not necessary for pivoting the wind deflector plate into the at-rest position. Apart from the fixing of the control member to the drive cable, virtually no other functional parts are required for the air guide device, because the control surface is provided directly on the connecting web which connects the wind deflector plate to the hinge axis. The present air guide device can be used in a simple manner on all sliding roof and sliding-lifting roof constructions, provided that the drive cable is guided beneath the forward, fixed automobile roof.

The connecting web can be shaped from the sheet metal material of the wind deflector plate in one piece with the latter and is rolled at its forward end to form a hinge eye. This makes it possible for a further reduction in the number of parts, because the connecting web, the wind deflector plate and the hinge eye are thereby formed in one piece of the same sheet material.

A good adaptation of the air guide device in its working position to the front edge of the roof opening is achieved by forming the wind deflector plate with a forward cranked zone which, in the working position, is adjacent to a vertical roof flange constituting the front edge of the roof opening and is orientated approximately parallel thereto, so that the deflector plate lies with its upper edge generally at the level of the external surface of the automobile roof, and to which the connecting web is attached underneath the roof edge flange.

The working position of the wind deflector plate can be defined by abutting of the connecting web, through the intermediary of rubber buffers or the like, against the lower edge of the roof flange. Thus the pivoting-out travel of the wind deflector plate into the working position can be limited in a simple manner and without risk of rattling.

A preferred construction of the control member, its sliding guide and its connection to the drive cable, is such that the control member comprises a support plate, guided on the forward part of the roof frame assembly, which support plate is constructed at its edge pointing towards the roof opening as a sliding shoe, which is associated by its lower surface with the control surface and is slidably guided by its upper surface on the forward part of the roof frame assembly. An entraining device, which is firmly attached to the drive cable, is fixed to the support plate. The sliding guide for the control member can be still further improved by forming the edge of the support plate orientated away from the roof opening as a guide shoe, which is slidably guided in a guide groove of the roof frame assembly.

For achieving a continuous pivoting-out and pivoting-in movement for the wind deflector plate, it is preferred for the lower surface of the sliding shoe to adjoin a run-on inclined surface situated on the sliding shoe, which inclined surface controls the pivoting movements of the wind deflector plate.

With advantage, the air guide device is symmetrically arranged on either side of the vehicle longitudinal axis, in respect of its movement-controlling elements, such that on each of the two sides of the longitudinal central axis of the vehicle, a connecting web having a control surface and a control member co-operating therewith are provided in conjunction with a hinge assembly.

BRIEF DESCRIPTION OF THE DRAWINGS

For a better understanding of the invention and to show how the same may be carried into effect, reference will now be made, by way of example, to the accompanying drawings, in which:

FIG. 1 is a perspective view of an automobile roof with a roof opening exposed by opening displacement of a sliding lid and with a wind deflector plate situated in the working position, FIG. 2 is a partial plan of the left, front corner of the automobile roof, illustrated without sliding lid.

DESCRIPTION OF THE PREFERRED EMBODIMENT

Figure 3:
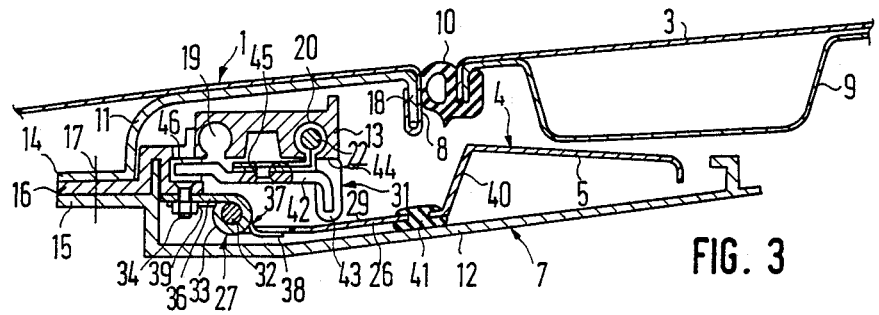
FIG. 3 is a section along the cranked section line III—III in FIG. 2, but with the sliding lid shown in its closed position.

As is evident from FIG. 1, a roof opening 2 is present in the forward region of a fixed automobile roof 1, with which opening there is associated a sliding lid 3 of a sliding-lifting roof, illustrated in the slid-open position. At the forward edge of the roof opening 2 is an air guide device referenced generally 4, of which the elongate wind deflector plate 5 is continuous over approximately the width of the roof opening 2 and, when the sliding lid 3 is slid open, is raised by its rear edge above the fixed automobile roof 1. This working position of the wind deflector plate 5 is illustrated in FIG. 1. The arrow 6 indicating direction of travel denotes the forward direction of movement of the automobile, to which the localizing indications hereinafter used "forward, rearward, left and right" exclusively refer. In FIG. 1 a roof frame assembly references generally 7 is also indicated, which surrounds the roof opening 2 at the front and sides and which hereinafter will be described in more detail with reference to the other Figures.

In FIG. 2, only the left half of the air guide device 4 and the elements situated in this zone of the siding-lifting roof construction are illustrated. The right half of the air guide device is substantially mirror-inverted, the longitudinal central axis of the vehicle forming the axis of symmetry and coinciding generally with the section line V—V. Because of this symmetry, only the left half of the apparatus will be explained below.

The edge of the roof opening is formed at front, sides and rear (not illustrated) by a vertical roof edge flange 8, which is bent back upwards through 180° at its lower edge. The sliding lid 3 is furnished, on its lower side, with a lid reinforcement 9, which is cranked vertically downwards at the outer rim of the sliding lid 3, like the sliding lid itself. Onto these adjacent downward flanges of sliding lid 3 and lid reinforcement 9, extending around the lid perimeter, an edge gap sealing profile 10 is pushed from below, which, when the sliding lid is closed, bears sealingly all around against the roof edge flange 8, as can be seen from FIGS. 3 and 5.

The roof frame assembly 7, surrounding the roof opening 2 and stiffening it from below, is composed of three parts, namely an upper mounting frame 11, a water channel 12 in one piece at front and sides, and a guide frame 13 likewise having a constant profile at front and sides, which guide frame forms, in its lateral regions, the guide rails for the sliding elements (not shown) by which the sliding lid 3 is slidably guided. At the outer edge, the mounting frame 11, water channel 12 and guide frame 13, each possess a fixing flange 14, 15, 16 respectively. The fixing flanges 14, 15 and 16 are disposed parallel to one another and, as indicated at 17, are screwed together.

The mounting frame fixed to the automobile roof 1 is provided on the inside with a vertically downwardly orientated flange 18, around which the roof edge flange 8 is bent. The single-piece guide frame 13 is situated with all its frame parts, i.e. at front and sides, at a distance from the roof edge flange 8 beneath the fixed automobile roof 1. The water channel 12, also formed in one piece, engages at front and sides beneath the guide frame 13 and the outer edge of the sliding lid 3, including the edge gap situated between the sliding lid 3 and the roof edge flange 8.

The guide frame 13 comprises two mutually adjacent, downwardly open cable guide ducts 19 and 20, in which flexible drive cables 21, 22 respectively are guided longitudinally slidably and in compression-stiff manner. As seen in FIG. 5, a drive pinion 23 of a driven device 24 fixed to the guide frame 13 engages force-transmittingly with the drive cables 21 and 22 which, as the drive pinion 23 revolves, are displaced in opposite directions in their cable guide ducts. This well-proven drive system is driven either as shown in FIG. 5, by a hand crank 25, or by an electric motor. From FIGS. 2, 3 and 6 the left-side drive cable 22 can be seen, which is not illustrated in FIG. 4 for purposes of simplicity.

The wind deflector plate 5 of the air guide device 4 is attached, via a connecting web 26 extending along the forward edge of the roof opening, to a hinge assembly 27, which defines a hinge axis 28 (FIG. 2) also extending parallel to the front edge of the roof opening, about which the wind deflector plate 5 can be pivoted. The upper surface of the connecting web 26, forms a substantially plane control surface 29, which co-operates with a control member 30, fixed in a manner to be described to the drive cable 22.

In this example, the connecting web 26 is shaped from the sheet material of the wind deflector plate 5 in one piece with the latter and is rolled around at its front edge to form a hinge eye 31. Through the hinge eye 31 a hinge pin 32 is passed, which on each side of the hinge eye 31 and, at a distance therefrom is passed through hinge eyes 33 of a hinge component 36 of the hinge assembly 27, fixed from below to a horizontal flange 35 of the guide frame 13 by screws 34. In the spaces between the hinge eyes 31 and 33, spring turns of a leg spring 37, threaded onto the hinge pin 32, are situated, which spring bears with its one leg 38 against the connecting web 26 from below and with its other legs 39 against the fixed hinge component 36 from below. The leg spring 37 biases the connecting web 26 and therefore the wind deflector plate 5 in a counterclockwise direction, so that when the control surface 29 is released by the control member 30, the connecting web 26 and the wind deflector plate 5 are pivoted out of the at-rest position illustrated in FIG. 3 into the working position illustrated in FIG. 4. The connecting web 26 extends beneath the front, fixed automobile roof 1, so that it is situated underneath the control member 30, guided longitudinally slidably on the guide frame 13.

Figure 4:
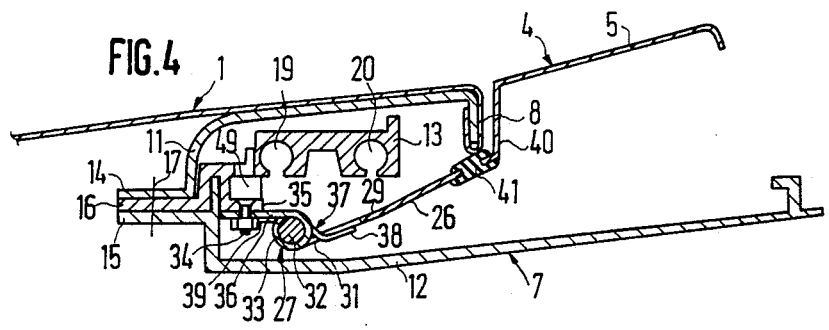
FIG. 4 is a section corresponding to FIG. 3, but with the sliding lid slid open.
Figure 5:
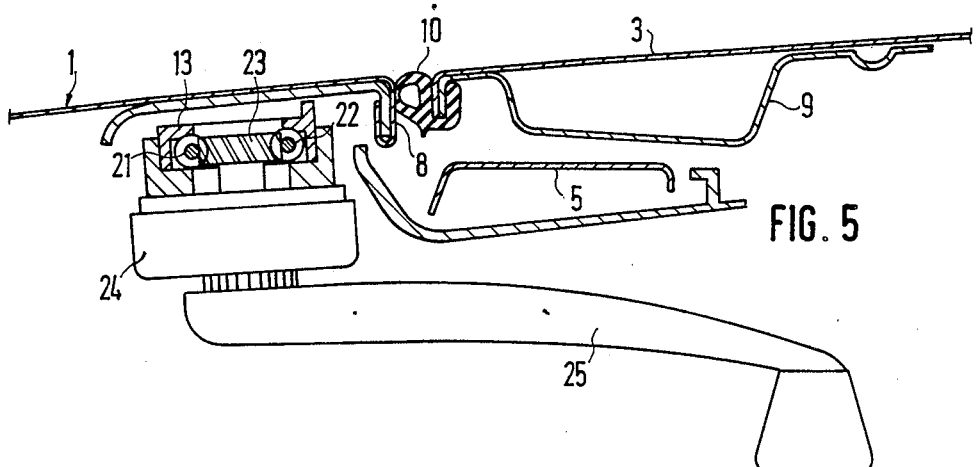
FIG. 5 is a section on the line V—V in FIG. 2 with sliding lid closed.

As can be seen from FIGS. 3 and 4, the wind deflector plate 5 possesses a front cranked zone 40, which in the working position (FIG. 4) is closely adjacent to the front roof edge flange 8 and aligned approximately parallel thereto. The height of the cranked zone 40 is so arranged that the cranked zone 40 lies at the top approximately at the level of the outer surface of the automobile roof 1, with the result that the outer surface of the wind deflector plate 5 adjoins the outer surface of the automobile roof 1 with a stepless transition. Beneath the roof edge flange 8, the cranked zone 40 is firmly connected with the connecting web 26, and in the example shown is in one piece therewith.

The described working position of the wind deflector plate 5 is defined by the abutting of the connecting web 26, through the intermediary of rubber buffers 41 or the like, against the lower edge of the roof edge flange 8, as shown in FIG. 4. The rubber buffers 41 are, in this example of embodiment, secured by press stud heads in openings of the connecting web 26 to this web.

The control member 30 comprises a support plate 42, guided on the front part of the roof frame opening 7, in the present example on the guide frame 13, which support plate is formed at its edge facing towards the roof opening 2 as a sliding shoe 43. For this purpose, a downwardly orientated flange of the support plate 42 has suitable plastics injection moulded around it. In the at-rest position shown in FIGS. 2 and 3, in which the roof opening 2 is closed by the sliding lid 3, the sliding shoe 43 bears against the control surface 29, while at the same time the rubber buffers 41 bear against the inner surface of the water channel 12, so that the wind deflector plate 5 is held, free of rattling, in its at-rest position underneath the sliding lid 3. The sliding shoe 43 is slidably guided by its upper face 44 against the front part of the roof frame assembly 7, in the present example against the lower face of the guide frame 13. To the support plate 42, an entraining device 45 is fixed, which is formed of a strip of metal sheet, which is wrapped around the drive cable 22, with the result that the control member 30 is fixed to the drive cable 22 and participates in the sliding movements of the latter.

The edge of the support plate 42 pointing away from the roof opening is constructed as a guide shoe 46, which is slidably guided in a guide groove 49 (FIG. 4) of the roof frame assembly 7, in the present example of the guide frame 13.

Figure 6:
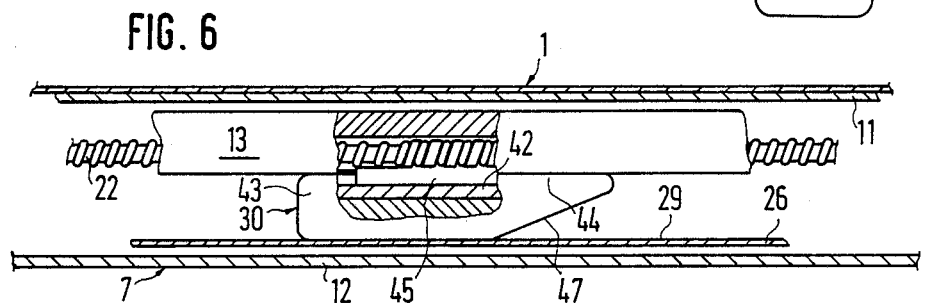
FIG. 6 is a partial, partly cut away section along the line VI—VI in FIG. 2.

The lower surface of the sliding shoe 43, associated with the control surface 29, is adjoined by a run-on inclined surface 47, which can be seen from FIG. 6. This run-on inclined surface 47, by running onto the left edge 48 of the connecting web 26 (FIG. 2), ensures that the wind deflector plate 5 is pivoted out of its working position into its at-rest position against the force of the leg spring 37. The run-on inclined surface 47, in co-operation with the edge 48, therefore controls the pivotal movements of the wind deflector plate 5.

In the position of the functional components of the sliding-lifting roof and of the air guide device shown in FIG. 2, the sliding lid 3 is situated in its closed position and the air guide device 4 in its at-rest position. If, starting herefrom, the sliding lid 3 is to be slid open, then the drive apparatus 24 is actuated in such a way that the drive cable 22 is displaced towards the left. As is usual in sliding roofs and sliding-lifting roofs, the rear edge of the sliding lid 3 is thereby initially lowered, in order that the lid can then be displaced beneath the rear, fixed automobile roof 1. The control member 30 here slides towards the left on the control surface 29, with the result that initially the air guide device 4 is still held in its at-rest position. As the displacement of the drive cable 22 in the direction indicated is continued, the control member 30 remains on the control surface 29 until the sliding lid 3 has reached an intermediate slid position, in which the wind deflector plate 5 can pivot upwards into its working position, without striking the front edge of the sliding lid 3. The outward pivoting of the wind deflector plate 5 does not take place suddenly, but as a consequence of the sliding of the edge 48 of the connecting web 26 along the inclined surface 47, in a sow, continuous movement, the speed of which is dependent upon the angle of inclination of the run-on inclined surface 47 and the displacement speed of the drive cable 22. After the control surface 29 has been completely released by the control member 30, the control member 30 passes, in the further course of the lid opening displacement, beyond the corner bend of the guide frame 13 into the lateral portion of the guide frame and finally reaches its limiting position, which is a function of the displacement travel of the lid. The control member 30 can here move freely and does not collide with any other components of the roof construction.

When, conversely, the slid-open sliding lid 3 is to be moved back into its closed position, then the drive cable 22 is driven in a movement direction towards the right, with the consequence that the control member 30, after passing the rounded corner of the guide frame 13, again approaches the edge 48 of the connecting web 26 and runs with its run-on inclined surface 47 finally onto this edge. As the drive movement continues, the wind deflector plate 5 now pivots about the hinge axis 28 against the force of the leg spring 37 in a slow, continuous movement downwards, until the control member 30 arrives with its lower surface on the control surface 29, causing the air guide device 4 to have reached its at-rest position. In the end phase of the closure displacement of the sliding lid until the rear edge of the sliding lid is raised into its closed position, the control member 30 remains on the control surface 29 and finally arrives in the starting position illustrated in FIG. 2.

Where the roof construction is that of a sliding-lifting roof, the drive cable 22 is driven further towards the right, in order to raise the sliding lid 3 by its rear edge above the automobile roof 1 to produce a rear ventilation gap. Here, the control member 30 also moves to the right on the control surface 29, but does not leave this surface before the maximum pivoted-up position of the sliding lid is reached. This air guide device 4 is therefore held in its at-rest position during the pivoting-out and pivoting-in movements of the sliding lid 3.

The length of the connecting web 26 and thus of the control surface 29 will depend upon the particular roof construction. In a sliding roof, the connecting web 26 can and immediately to the right of the control member 30 in its position in FIG. 2. In a sliding-lifting roof, in contrast, the connecting web 26 must be continued further towards the drive apparatus 24, as FIG. 2 illustrated.

We claim:

1. An air guide device for an automobile roof, which comprises a roof opening surrounded at front and sides by a roof frame assembly, which opening can be closed by a sliding lid, guided on guide rails mounted laterally on the roof frame assembly and driven by drive cables slidable in compression-stiff manner therein, the device comprising a wind deflector plate, pivotal along the front edge of the roof opening about a hinge axis, subject to spring stress, and adjustable into a working position and at-rest position respectively as a function of the movements of the sliding lid by a control member guided in the direction of the hinge axis, wherein the control member can be displaced by a drive cable moving with the sliding lid and adjusts the wind deflector plate via a control surface in rigid connection therewith, and the control surface is substantially planar and is provided on the upper face of a connecting web, which is disposed between the hinge axis and the wind deflector plate and which extends beneath the forward, fixed automobile roof, and the control member is fixed to one of the drive cables, for the sliding lid and, for the purpose of pivoting the wind deflector plate, runs onto and runs off respectively the control surface and rests on it in the at-rest position of the wind deflector plate.

2. A device according to claim 1, wherein the connecting web is shaped from the sheet metal material of the wind deflector plate in one piece with the latter and is rolled at its forward end to form a hinge eye.

3. A device according to claim 1, wherein the wind deflector plate possesses a forward cranked zone which, in the working position, is adjacent to a vertical roof flange constituting the front edge of the roof opening and is orientated approximately parallel thereto, so that the deflector plate lies with its upper edge generally at the level of the external surface of the automobile roof, and to which the connecting web is attached underneath the roof edge flange.

4. A device according to claim 1, wherein the working position of the wind deflector plate is defined by abutting of the connecting web, through the intermediary of rubber buffers or the like, against the lower edge of the roof flange.

5. A device according to claim 1, wherein the control member comprises a support plate, guided on the forward part of the roof frame assembly, which support plate is constructed at its edge pointing towards the roof opening as a sliding shoe, which is associated by its lower surface with the control surface and is slidably guided by its upper surface on the forward part of the roof frame assembly, and an entraining device, which is firmly attached to the drive cable, is fixed to the support plate.

6. A device according to claim 5, wherein the edge of the support plate orientated away from the roof opening is formed as a guide shoe, which is slidably guided in a guide groove of the roof frame assembly.

7. A device according to claim 5, wherein a lower surface of the sliding shoe adjoins a run-on inclined surface situated on the sliding shoe, which inclined surface controls the pivoting movement of the wind deflector plate.

8. A device according to claim 1, wherein on each of the two sides of the longitudinal central axis of the vehicle, there is a said connecting web having a control surface and a said control member co-operating therewith in conjunction with a hinge assembly.

* * * * *